US009287939B2

(12) United States Patent
Xu et al.

(10) Patent No.: US 9,287,939 B2
(45) Date of Patent: Mar. 15, 2016

(54) METHOD FOR JOINT OPTIMIZATION OF SCHEDULE AND RESOURCE ALLOCATION BASED ON THE GENETIC ALGORITHM

(71) Applicant: Beijing University of Posts and Telecommunications, Beijing (CN)

(72) Inventors: Xiaodong Xu, Beijing (CN); Xiaofeng Tao, Beijing (CN); Da Wang, Beijing (CN); Qimei Cui, Beijing (CN); Ping Zhang, Beijing (CN); Xin Chen, Beijing (CN); Dezhuang Wu, Beijing (CN)

(73) Assignee: Beijing University of Posts and Telecommunications, Beijing (CN)

( * ) Notice: Subject to any disclaimer, the term of this patent is extended or adjusted under 35 U.S.C. 154(b) by 354 days.

(21) Appl. No.: 13/896,448

(22) Filed: May 17, 2013

(65) Prior Publication Data

US 2013/0308570 A1 Nov. 21, 2013

(30) Foreign Application Priority Data

May 17, 2012 (CN) .......................... 2012 1 0155124

(51) Int. Cl.
*H04B 7/02* (2006.01)
*H04W 72/04* (2009.01)
*H04J 11/00* (2006.01)

(52) U.S. Cl.
CPC ............... *H04B 7/024* (2013.01); *H04W 72/04* (2013.01); *H04J 11/0053* (2013.01)

(58) Field of Classification Search
CPC ............... H04B 7/024; H04B 7/0617; H04L 2001/0093; G06N 3/12; G06N 3/126; G06F 19/18
See application file for complete search history.

(56) References Cited

U.S. PATENT DOCUMENTS 6,662,167 B1 * 12/2003 Xiao ....................... G06N 3/126
706/12
7,434,216 B1 * 10/2008 O'Neill ..................... G06F 8/68
711/158

(Continued)

FOREIGN PATENT DOCUMENTS

| CN | 1968489 A | 5/2007 |
| CN | 101146079 A | 3/2008 |
| CN | 101262701 A | 9/2008 |

OTHER PUBLICATIONS

Study of Resource Allocation in Broadband over Power-line Systems.

*Primary Examiner* — Xavier Szewai Wong
(74) *Attorney, Agent, or Firm* — McCarter & English, LLP; Jill A. Mello, Esq.; Kia L. Freeman, Esq.

(57) ABSTRACT

The invention relates to the technical field of wireless communication, and provides a method for joint optimization of schedule and resource allocation based on a genetic algorithm, which is applied in a CoMP communication system. The method includes steps of: S1, encoding chromosome; S2, initializing setting; S3, computing fitness value; S4, determining whether the optimal solution is better than an elite: if yes, updating the elite and executing S5, and if no, turning to S5; S5, determining whether a predetermined generation of population has been generated or not, if no, executing S6, otherwise, turning to S8; S6, participating reproduction process to generate two offspring chromosome individuals; S7, determining whether a predetermined number of offspring chromosome individuals have been generated, if yes, turning to S3 to compute again; otherwise keeping on reproduction; S8, performing schedule and resource allocation according to a solution corresponding to the elite. Under the condition of satisfying schedule limitation and power limitation, the method can, by uniting schedule and resource allocation, efficiently optimize system performance with less computing complexity.

10 Claims, 5 Drawing Sheets

(56) References Cited

U.S. PATENT DOCUMENTS

| | | | | |
|---|---|---|---|---|
| 8,499,001 B1* | 7/2013 | To | ........................... | G06N 3/126 707/741 |
| 2008/0154809 A1* | 6/2008 | Stockwell | ................ | G06N 3/12 706/13 |
| 2008/0253383 A1 | 10/2008 | Sehgal et al. | | |
| 2010/0106714 A1* | 4/2010 | Lim | .................. | G06F 17/30424 707/718 |
| 2011/0082821 A1* | 4/2011 | Abido | .................... | G06N 3/126 706/13 |
| 2011/0098054 A1* | 4/2011 | Gorokhov | ............. | H04B 7/024 455/452.1 |
| 2011/0274185 A1* | 11/2011 | Gan | ..................... | H04B 7/0417 375/259 |

* cited by examiner

METHOD FOR JOINT OPTIMIZATION OF SCHEDULE AND RESOURCE ALLOCATION BASED ON THE GENETIC ALGORITHM

RELATED APPLICATIONS

This application claims the benefit of Chinese Application No. CN 201210155124.8, filed May 17, 2012, the entire contents of which is hereby expressly incorporated herein by reference.

FIELD OF THE INVENTION

The invention relates to the technical field of wireless communication, and more particularly, to a method for joint optimization of schedule and resource allocation based on the genetic algorithm.

BACKGROUND OF THE INVENTION

In recent years, with development of the mobile communication technology, ability of the mobile communication system for supporting wireless communication business has been significantly increased. However, users raise higher requirements for multimedia service with high rate and quality. Therefore, in research of next generation of the mobile communication technology, higher requirements are raised in respect of aspects, such as spectrum efficiency, transmission rate, system throughput, and cell-edge performance and the like. Orthogonal Frequency Division Multiplexing Access (OFDMA), as one of key technologies for next generation of the wireless communication system, can reduce intra-cell interference effectively, but it cannot get rid of affection of inter-cell interference, which results in degradation of system performance. Specifically, for the cell-edge user with lower Signal to Noise Ratio, incorrect encoding caused by strong interference might lead to greatly reducing of throughput. Since coordinated Multi-point Transmission/Reception (COMP) technology can improve performance of cell-edge users, and reduce or even eradicate the inter-cell interference, it has been widely focused on and researched by industry in recent years and becomes an important study project of 3GPP LTE-Advanced standardization.

The concept of CoMP communication technology is expanding a conventional cellular network to be a Multiple Input Multiple Output (MIMO) system of multiple cells, i.e., multiple cooperating base stations provide service for cooperating users by simultaneously using same wireless resources. Thus, signal from a neighbor cell is used as auxiliary transmission signal, instead of dominant interference resources, to provide service for the cooperating users. However, great challenge is brought for user schedule and wireless resource allocation when introducing the new technology of CoMP communication technology. Schedule and resource to allocation is performed among multiple cooperating cells, which means that the scale of a complicated problem is further enlarged and the constraints for the problem is increased and stricter.

At present, enormous efforts have been made for solving the problem of schedule and resource allocation of CoMP system. For example, D. Choi, et al., proposed a solution for schedule and resource allocation of CoMP system with multiple carriers (D. Choi, D. Lee, J. Lee, *Resource allocation for CoMP with multiuser MIMO-OFDMA*, IEEE Trans. On Vehicular Technology, vol. 60, pp. 4626-4632, November 2011). Three modulating modes, which are supported by LTE system, are used in the solution of the prior art and the influence of frequency-selective channel is considered as well, which means that the solution can be used directly in next generation of communication system based on OFDM. However, in order to reduce complexity, joint optimization problem in the prior art is solved through proceeding two independent steps, i.e. determining schedule plan at first, and then performing bit and power allocation based on the plan. In addition, an allocation way based on a greedy algorithm is adopted, wherein, on the condition of satisfying power constraints of each base station, one bit is allocated each time to a user which needs the minimum transmission power for transmitting an extra bit and its corresponding subcarrier. Since the solution in the prior art separates the schedule and the resource allocation apart and the greedy algorithm only can select the presently best result, the application of a sub-optimum algorithm, which can not consider the overall interests, in the solution of the prior art will inevitably affect the schedule of the whole system and the resource allocation capability.

SUMMARY OF THE INVENTION

With respect to the above-mentioned problem in the prior art of the schedule and resource allocation solution cannot consider the whole situation due to big scale and strict constraints, the present invention provides a method for joint optimization of schedule and resource allocation based on the genetic algorithm.

In order to solve above technical problem, the invention specifically is implemented as follows.

Firstly, the invention provides a method of joint optimization schedule and resource allocation to based on the genetic algorithm, which is applied in a CoMP system. The method includes steps of:

S1, designing encoding chromosome for a potential solution of a problem;

S2, initializing settings, i.e., setting an initial population, an elite, and control parameters of the genetic algorithm;

S3, computing fitness values of respective chromosomes in a new population including the elite;

S4, determining whether the optimal solution is better than the elite, if yes, updating the elite and then proceeding step S5; otherwise, directly turning to step S5;

S5, determining whether a predetermined generation of population has been generated, if no, proceeding step S6; otherwise, directly turning to step S8;

S6, participating in reproduction process and generating two offspring chromosome individuals in the population;

S7, determining whether a predetermined number of offspring chromosome individuals have been generated, if yes, turning to step S3 to compute again; otherwise, returning to step S6 and keeping on the reproduction;

S8, performing the user schedule and resource allocation in the CoMP communication system according to the solution corresponding to the elite.

Preferably, in step S1, the chromosome individual is encoded in two-dimensional binary.

Preferably, in step S1, if bandwidth of a base station in the system is divided into M subcarriers uniformly, each chromosome individual consists of M genetic vectors, with binary bits of each genetic vector being divided into two parts of user schedule policy and bit allocation status.

Preferably, in step S2, the control parameters which are initialized include population size, number of generations, and mutation probability.

Preferably, in step S3, the fitness value is calculated based on a fitness function of a penalty function.

Preferably, in step S3, the fitness function is as follows:

$$Fit(G) = \begin{cases} R(G) & G \text{ is feasible solution} \\ R(G) + \lambda_0 \cdot \sum_{n=1}^{N} \text{penalty}(n, G) & G \text{ is unfeasible solution} \end{cases}$$

wherein, R(G) is an optimal target value corresponding to the chromosome G, and 0 is a penalty factor reflecting toughness of penalty; penalty(n, G) is a punishment which is brought as the power constraint of the base station n cannot be satisfied, and is defined as negative different value between the maximum transmission power and the actual transmission power of the base station n; N is the number of cooperating base stations in the system.

Preferably, the function of the optimal target value is as follows:

$$\max R = \sum_{m=1}^{M} \sum_{k \in S_m} b_{m,k}$$

$$\max R = \sum_{k \in S_m} \log_2\left(\sum_{m=1}^{M} b_{m,k}\right)$$

or $$\max R = \sum_{m=1}^{M} \sum_{k \in S_m} w_k \cdot b_{m,k};$$

wherein, M is the number of subcarriers resulted from equally dividing the bandwidth of the base station in the system; $b_{m,k}$ represents bit rate of user k on subcarrier m, and when three modulating modes, i.e. QPSK, 16QAM, 32QAM, supported by LTE is used, $b_{m,k}$ {0,2,4,6}; $s_m$ is a set of the users scheduled on the subcarrier m and the number of elements in the set is less than or equal to N; and $W_k$ is a weight value of user k, in which the weight value is proportional to the lowest rate requirement of the user.

Preferably, in step S6, the reproduction process includes four stages of selection, crossover, mutation, and correction.

Preferably, in the stage of selection, Roulette wheel selection algorithm is used for selecting parents.

Preferably, in the stage of crossover, crossover is uniformly performed.

The invention provides a method for joint optimization of schedule and resource allocation based on the genetic algorithm, which jointly performs schedule and resource allocation under the condition of satisfying limitations of schedule and power so as to optimize performance of to the system with lower computing complexity, high efficiency, and reliability. Specifically, the invention implemented with the joint optimization of schedule and resource allocation will not possess the disadvantage of performance loss because of separation of the schedule and the resource allocation. In addition, the invention has no defects from greedy algorithm in the prior art either, and can get a solution more close to the optimal solution from exhaustive search; the computing complexity of the genetic algorithm used in the present invention is far less than exhaustive search, thus performance and throughput of the system can be balanced; finally, since the genetic algorithm is very robust, it is suitably applied in a real system and thus has a better prospect of application.

DETAILED DESCRIPTION OF THE INVENTION

The technical solutions of the embodiments of the disclosure are described in a clear and complete manner in association with the accompanying drawings as follows. Apparently, the described embodiments are merely a part of, rather than, all embodiments of the disclosure. Without making any inventive attempts, other embodiments obtained by those ordinary persons who are skilled in the art based on the described embodiments of the disclosure should fall into the scope of the disclosure.

Figure 1:
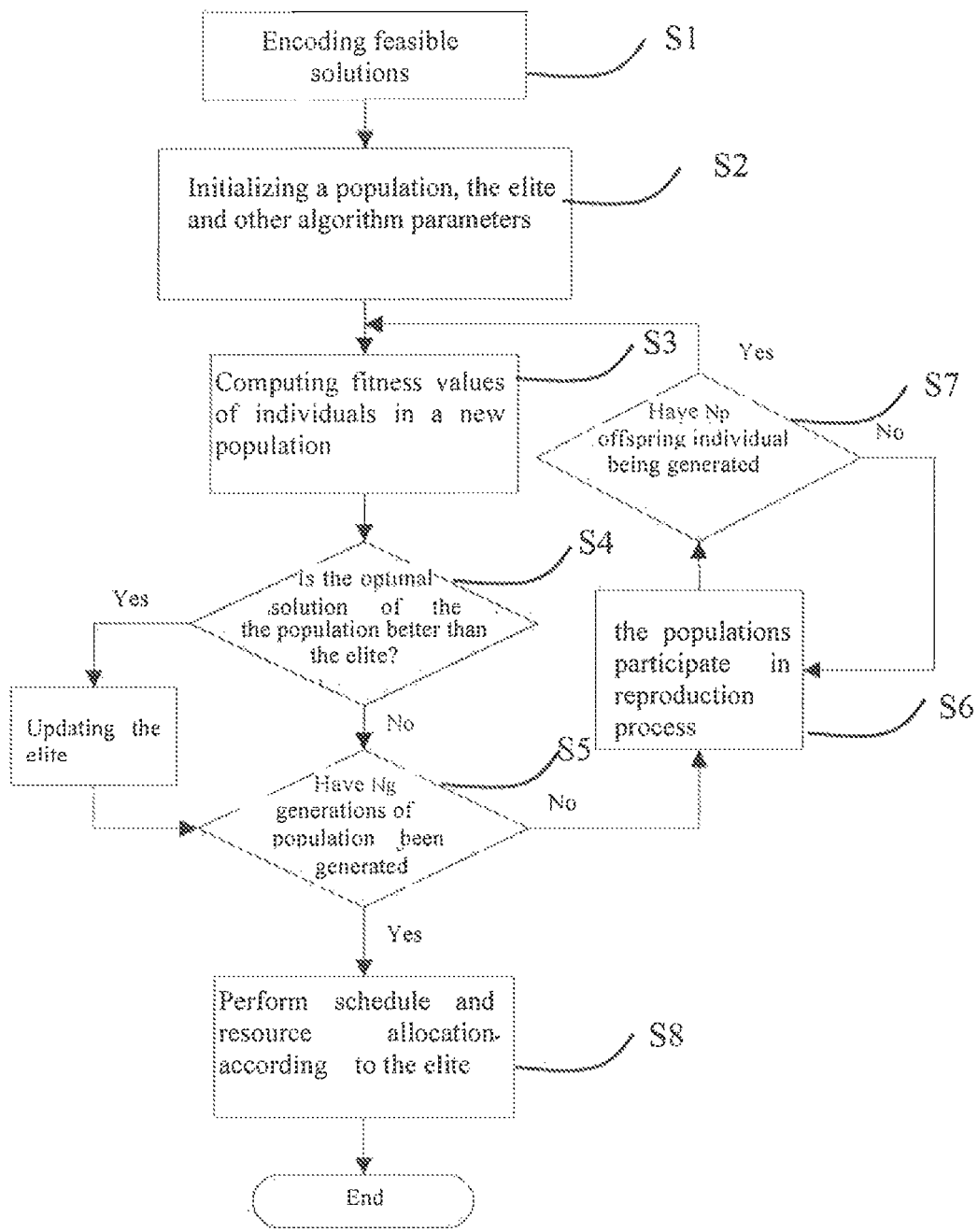
FIG. 1 is a flow chart of a method for joint optimization of schedule and resource allocation based on the genetic algorithm in embodiments of the present invention.

In order to solve the problem that the solution of schedule and resource allocation cannot consider the whole situation, the present invention provides a method for joint optimization schedule and resource allocation based on the genetic algorithm. The method is mostly used in a communication system using CoMP technique. As shown in the flow chart of FIG. 1, the basic process of the method in the present invention includes the following steps:

S1, designing encoding chromosome for a potential solution of a problem;

S2, performing initializing settings, i.e., setting an initial population, the elite, and control parameters of the genetic algorithm which include population size $N_p$, generation number $N_g$, and mutation rate $P_m$, etc.;

S3, computing fitness values of respective chromosomes in a new population including the elite;

S4, determining whether the optimal solution in the current population is better than the elite, if yes, update the elite and then execute step S5; otherwise, directly turning to step S5;

S5, determining whether $N_g$ generation of population has been generated, if no, proceeding step S6; otherwise, directly turning to step S8;

S6, participating in reproduction process and generating two offspring individuals in the population, in which the reproduction process includes four steps of selection, crossover, mutation, and correction;

S7, determining whether $N_p$ offspring individuals have been generated, if yes, turning to step S3 to compute again; otherwise, returning to step S6 and keep on the reproduction;

S8, performing the user schedule and resource allocation in the CoMP system according to to fitness value to the elite.

Further description of the present invention is given as follows. In the present invention, firstly it is assumed that: the wireless communication system includes N cooperating base stations and K cooperating users, with the base stations and their mobile terminals being configured with a transmitting single antenna and a receiving single antenna respectively; the base stations have a same maximum transmission power $P_{max}$ and bandwidth which is divided equally into M subcarriers; user data and channel status information can be exchanged quickly and reliably between respective base stations via a core and backhaul network; by using a linear predictive encoding, the collaborative system can enable at most N users to get service simultaneously on any subcarrier. In addition, it is assumed that three modulating types: QPSK, 16QAM and 64QAM are used in the system, and thus the transmission bit of respective users on respective carries {0,2, 4,6}.

Steps S1 and S2 involve encoding design and initializing:

Before dealing with the problem according to the present invention, it is required to encode the chromosome individuals so as to represent a potential possible solution of the problem. A technical solution of two-dimensional binary encoding is provided hereby, in which the term "binary" means that the value of each bit can only have two values: "1" and "0", the term "two-dimension" means that a chromosome contains multiple rows and multiple volumes of code-words. Furthermore, gene vector $g_m$ indicates user schedule and bit allocation policy on one subcarrier, M gene vectors constitute a complete chromosome $G=[g_1^T, g_2^T, \ldots, g_m^T]^T$. In this case, each gene vector includes $K+N\cdot\log_2 Q$ binary bits, in which Q represents number of possible values of transmission bit, for example, Q=4 here. Gene vectors are further divided into two parts, with each part corresponding to user schedule policy (hereafter called Part 1) and bit allocation scenario (hereafter called Part 2) respectively.

Part 1 consists of K binary bits which correspond to schedule scenarios of K users on the subcarrier, wherein, "1" of each bit represents schedule user, and "0" of each bit represents non-schedule user. It should be noted that, because at most N users can be scheduled on each subcarrier, algebraic sum of all bits (i.e., number of "1") in the Part 1 must be less than or equal to N. Part 2 consists of $N\cdot\log_2 Q$ binary bits, which corresponds to the bit rate of each schedule user in Part 1 sequentially, wherein $\log_2 Q$ is the number of binary bits required by four kinds of possible bit rates; specifically, the first bit rate in Part 2 corresponds to the schedule user represented by the first "1" in Part 1, the second bit rate in Part 2 corresponds to the schedule user represented by the second "1" in Part 1, and so on.

Figure 2:
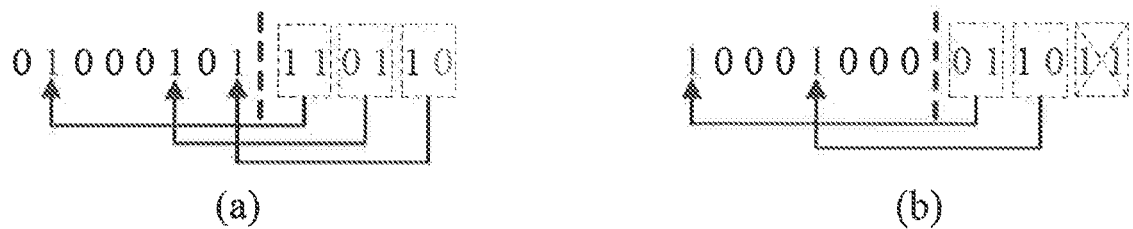
FIG. 2 shows two typical genetic vectors in the preferred embodiments of the present invention.

For example, it is supposed that the system includes 3 cooperating base stations and 8 cooperating users, i.e., N=3, K=8. FIG. 2 illustrates schematic diagrams of two kinds of typical gene vectors. FIG. 2 (a) shows that users 2, 6, and 8 are scheduled, which corresponds to the bit rate encoded as 11, 01, and 10 respectively; in this case, the corresponding relationship between the bit rates and the binary codes is shown as in Table 1. Therefore, the transmission bits of user 2, 6, and 8 are 6, 2 and 4 respectively, with the modulating types being 64QAM, QPSK, and 16QAM respectively.

TABLE 1

Binary codes corresponding to transmission bits in FIG. 2 (a)

| | Transmission bit | | | |
|---|---|---|---|---|
| | 0 | 2 | 4 | 6 |
| code | 00 | 01 | 10 | 11 |

FIG. 2 (b) represents that users 1 and 5 are scheduled, wherein, corresponding transmission bits are 2 and 4 respectively and modulating type of QPSK and 16QAM are adopted respectively, and the last two bits of the gene vector can be ignored.

At the beginning stage of the algorithm, an initial population containing $N_p$ chromosome individuals is generated randomly; with continuous evolution of the population, the number of individuals therein keeps unchanged.

In step S3, fitness values of respective chromosomes in the new population are computed according to a fitness function.

In this case, the fitness function is used for measuring whether the solution corresponding to the chromosome is good or not. The basic principle of the function is that the greater the optimal target value corresponding to the chromosome is, the stronger the fitness is. However, with respect to the problem to be solved in the present invention, due to influence of respective power constraints of the base stations, not all of the chromosomes are feasible solutions for the to problem. In order to satisfy the power constraints, the invention further puts forward a fitness function based on a penalty function, that is, for any individual violating the constraints (i.e., infeasible solution), a punishment is imposed by adding a penalty term to the fitness value so as to reduce the fitness value of the individual. The express of the preferred fitness function in the present invention is as follows:

$$Fit(G) = \begin{cases} R(G) & G \text{ is feasible solution} \\ R(G) + \lambda_0 \cdot \sum_{n=1}^{N} \text{penalty}(n, G) & G \text{ is unfeasible solution} \end{cases} \quad (1)$$

In formula (1), R(G) is an optimal target value corresponding to chromosome G, and $\lambda_0$ is a parameter of the penalty function, or called as a penalty factor, which can reflect the toughness of the penalty. Penalty (n, G) is a punishment which is caused as the power constraint of the base station n is not satisfied, and defined as negative different value between the maximum transmission power and the actual transmission power of the base station n. Thus, a certain quantity of infeasible solutions can be maintained in the population, which increases diversity of the individuals in the population, and makes the genetic algorithm search in both feasible and infeasible domains simultaneously and quickly find the optimal solution of the problem.

Step S6 involves reproduction process of the population:

Offspring individuals generated in step S6 will make all genes of feasible and infeasible chromosomes enter to the next generation of population by the reproduction process. Specifically, the reproduction process includes four parts as follows: selection, crossover, mutation, and correction.

1. Selection

Preferably, in the present invention Roulette wheel selection is used for selecting parents, wherein individuals with higher fitness values are more likely selected as parents and the probability to be selected as parents for chromosome $G_i$ is:

$$p_i = \frac{Fit(G_i)}{\sum_{j=1}^{Np} Fit(G_j)} \quad (2)$$

It should be noted that the selected chromosomes are not taken away from the population, therefore one chromosome might be selected more than twice.

2. Crossover

Figure 3:
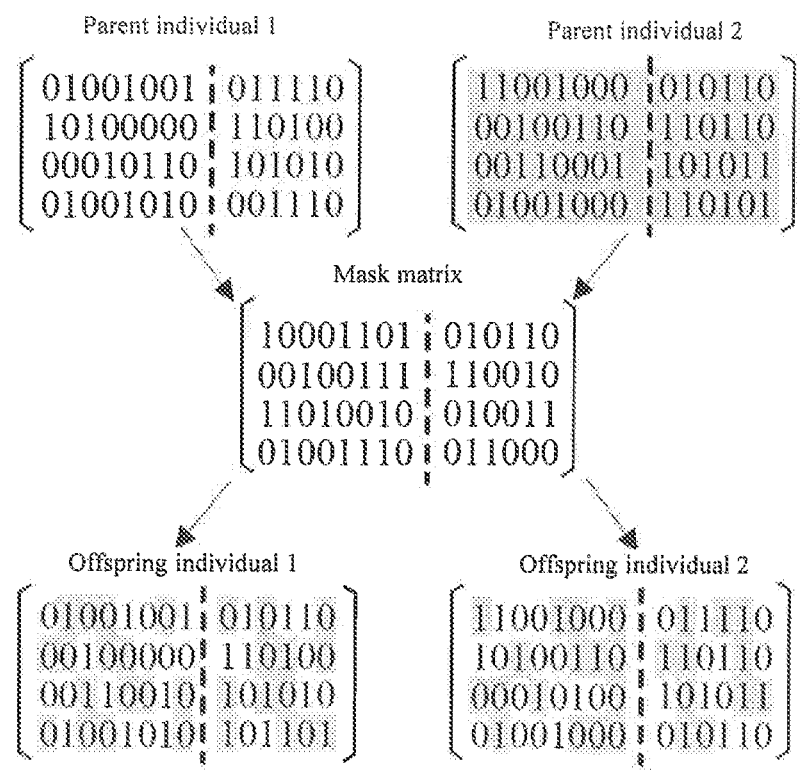
FIG. 3 shows an example of a uniform crossover in the preferred embodiments of the present invention.

Preferably, uniform crossover is adopted in the present invention. Comparing with single-point crossover and multipoint crossover, uniform crossover has broader sense. In uniform crossover, each crossover point is taken as a potential crossover point and a 0-1 matrix of mask which is as large as the chromosomes is randomly generated, wherein a segment in the mask indicates which parent individual provides variable values to the offspring individual. FIG. 3 shows an example of uniform crossover, in which, the number of system base stations is 3, the number of users is 8, and the number of subcarriers is 4. For offspring individual 1, "1" represents genetic value provided by parent individual 1; "0" represents genetic value provided by parent individual 2, while for offspring individual 2, the rule is reversed.

3. Mutation

After crossover, each offspring individual has to experience the process of mutation. In the present invention, mutation probability $P_m$ (which is normally small, $P_m \leq 0.05$) is set. With respect to each bit of gene of each chromosome in the set of offspring individuals after crossover, a random number r [0,1] is generated, and if $r \leq P_m$, the bit is changed to be "1-*". Otherwise, the bit "*" keeps unchanged. Specifically, the number (0 or 1) is changed to be another number (1 or 0); otherwise, the bit keeps unchanged.

4. Correction

After the uniform crossover and the mutation mentioned above, the generated offspring individuals may not satisfy the schedule constraints any more, which results in that more than N users are scheduled on some subcarriers. Therefore, it is required to correct the individuals which experienced the crossover and do not satisfy the schedule constraints. In the process of the correction, whether algebra sum of each bit in Part 1 of each gene vector is more than N is determined firstly, and if yes, a position with value of 1 is randomly selected, and then the value of 1 is set to be 0 till the constraints are satisfied. In addition, the number of 1 in part 1 might be 0, and thus a bit is randomly set to be 0.

Figure 4:
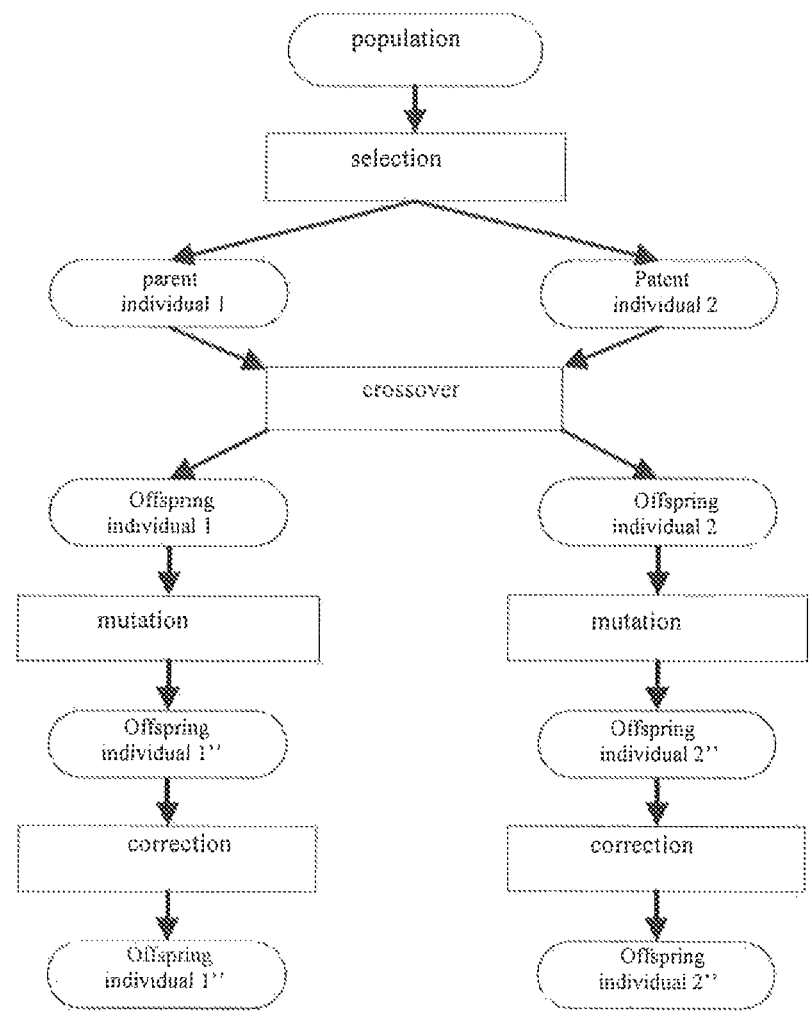
FIG. 4 is an exemplary flow chart of reproduction process in the preferred embodiments of the present invention.

The illustrative flowchart for the above reproduction process is shown as in FIG. 4. Because two parent individuals can only generate two offspring individuals, it is necessary that the to reproduction process is continued till $N_p$ offspring individuals are generated in order to produce next generation of population.

Figure 5:
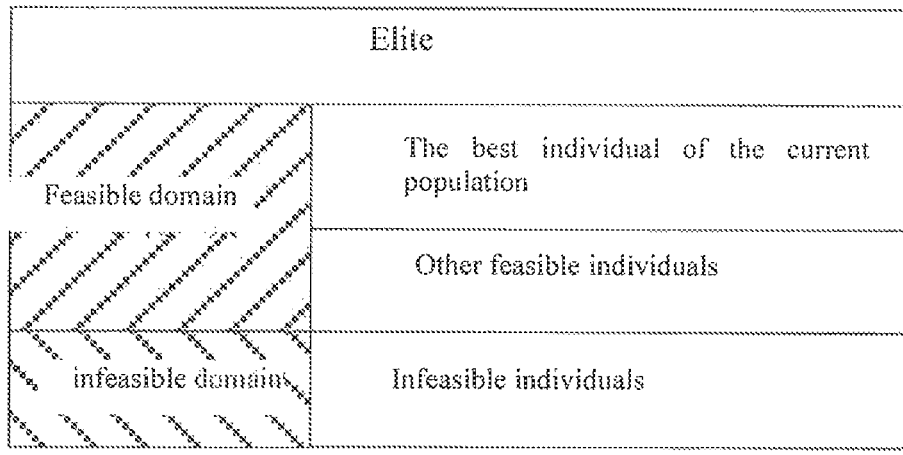
FIG. 5 shows a structure of a population including the elite in the preferred embodiments of the present invention.

Finally, in order to satisfy convergence condition of the genetic algorithm, the classic genetic algorithm is modified in the present invention. Specifically, a super individual named elite, as the $N_p+1$th member, is added in each population. Thus, as shown in FIG. 5, a new population structure is designed, in which the best individual of the current population is the best feasible solution of the newly generated individuals. In the present invention, the elite do not participate in the reproduction process. The rule for updating the elite is as follows: a. if the best individual in the current population is better than the elite, the elite is replaced with the best individual; b. otherwise, the elite keeps being unchanged (is maintained).

It should be noted that the number of generations required for obtaining the optimal solution is unknown. Therefore, generally the greatest number of generations is fixed in advance in real practice, e.g., is set to be $N_g$. When the algorithm is finished, the schedule and bit allocation policy of the CoMP system will be based on the solution corresponding to the current elite.

The solution of the present invention will be illustrated further in detail below in combination with the accompanying drawings and specific embodiments.

Embodiment 1

Figure 6:
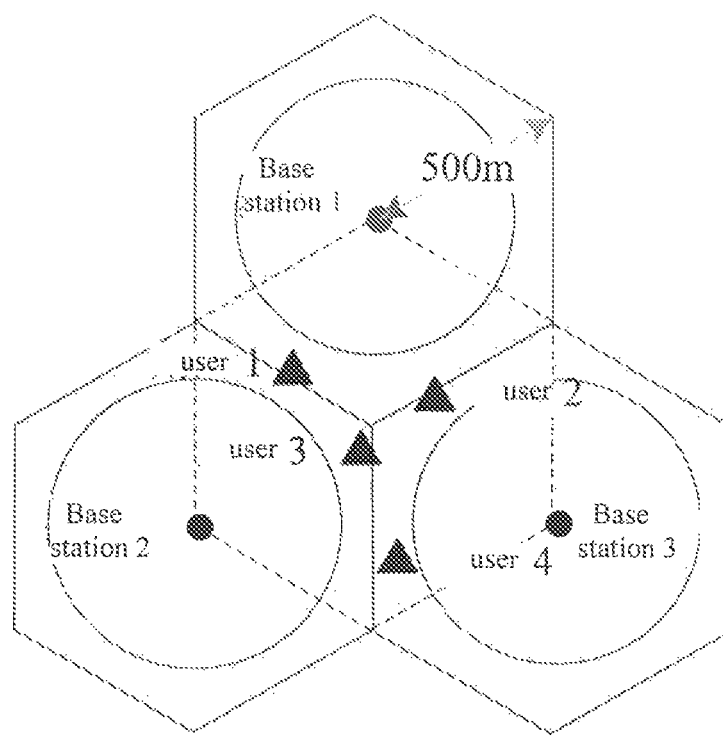
FIG. 6 is a schematic diagram of application environment in an embodiment of the present invention.

Take a downlink CoMP system for example, environment of Embodiment 1 is shown in FIG. 6. N neighbor base stations, e.g., N=3, simultaneously provide service to users which are distributed randomly at cell edges of shadow areas, wherein the radium of each cell is averagely 500 m and each base station has the same maximum transmission power. Moreover, it is assumed that there are M subcarriers in this system, e.g., M=4, and a reuse factor 1 is reused in each base station, and large-scale fading, shadow fading and Rayleigh fading in channels between the base station and the user are considered, and for the genetic algorithm, a population contains $N_p$ individuals, e.g., $N_p$=50, $N_g$ generations' searching is performed, e.g., $N_g$=100 and the mutation probability is $P_m$=0.05.

to Target R is optimized as the greatest system total transmission bits as follows:

$$\max R = \sum_{m=1}^{M} \sum_{k \in S_m} b_{m,k} \quad (3)$$

wherein $b_{m,k}$ represents bit rate of user k on subcarrier m and $b_{m,k} \{0,2,4,6\}$; $s_m$ is the set of the users which are scheduled on the subcarrier m and the number of elements in the set is less than or equal to N.

Figure 7:
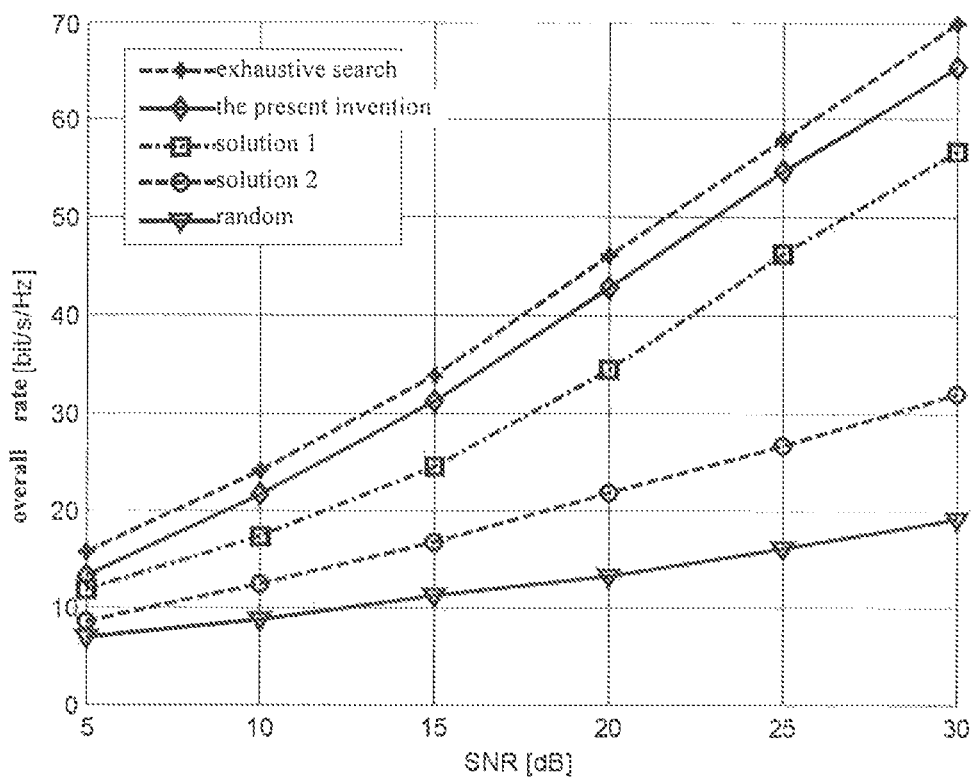
FIG. 7 is a diagram illustrating overall rate comparison between the implementing of solution of the present invention in an embodiment and the solution in the prior art.

FIG. 7 is a diagram of overall rate comparison of the implementing of solution of the present invention and the implementing of solutions of the prior art. Solution 1 and 2 of the prior art come from reference of D. Choi, et al., both of which separate schedule and resource allocation, and adopt a bit power allocation algorithm based on a greedy algorithm. Wherein, solution 1 adopts a suboptimum schedule method based on total transmission bits, and solution 2 adopts a random schedule method and a full search method, with the number of users is K=10. As shown in FIG. 7, in the aspect of throughput, the method of the present invention can obtain a result from approximately exhaustive search which is far better than other solutions of the prior art. Among those solutions of the prior art, the random solution has the worst performance, and solution 1 has the worse performance. The performance of solution 2 of the prior art is worse than that of the solution of the present invention because the solutions according to both the schedule method and the resource allocation method of the solution 2 are suboptimum solutions and that the schedule method and the resource allocation are separated apart further degrade the performance.

Figure 8:
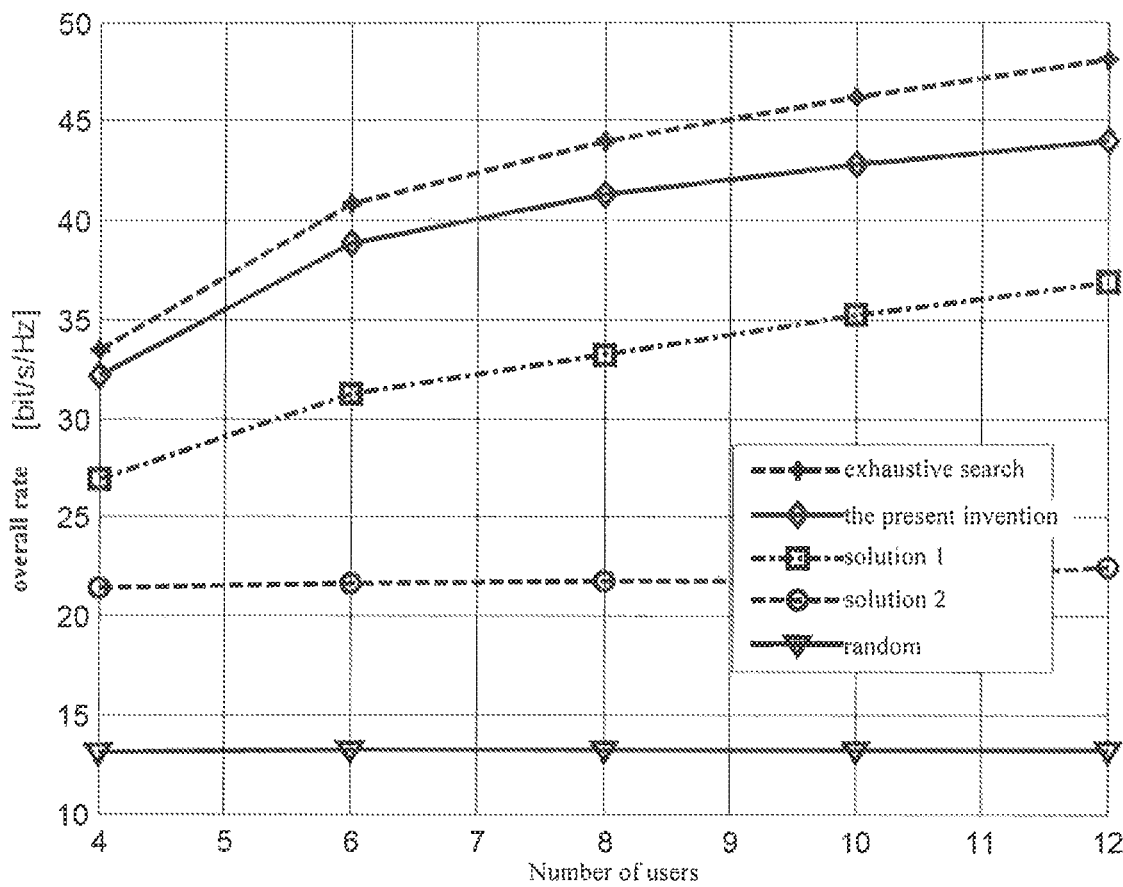
FIG. 8 shows overall rate comparison of different solutions in an embodiment when the number of users are different and SNR=20 dB.

FIG. 8 shows overall rate comparison among different solutions with different user numbers when SNR=20 dB so as to better verify multiuser diversity performance of the solutions. As shown in FIG. 8, overall rates of the method of the present invention, exhaustive search, and solution 1 of the prior art is increased as the number of users is increased, which shows that the three solutions can use multiuser diversity better. In addition, performance gap between the solution of the present invention and the exhaustive search will become larger and larger as the number of users increases, since the computing complexity in the present invention is smaller than that of the exhaustive search as the searching space increases, but at to the cost of sacrificing performance in a degree However, the overall bit rate of solution 2 of the prior art and the random solution is almost unchanged as the number of users increases, because both of solution 2 and the random solution adopt policy of random user schedule and thus cannot make good use of multiuser diversity.

Embodiment 2

The downlink CoMP system, system module setting, and parameters involved in Embodiment 2 are the same as those in Embodiment 1. To balance both overall system rate and fairness of the users, different target functions and their corresponding fitness functions can be set so as to obtain different optimal targets. Proportional fair is well known as a rule for balancing throughput and fairness of users. In order to take fairness of cell-edge users into consideration as well, the way of schedule and resource allocation can maximize the following target function:

$$\max R = \sum_{k \in S_m} \log_2 \left( \sum_{m=1}^{M} b_{m,k} \right) \quad (4)$$

In formula (4), $b_{m,k}$ and $s_m$ are the same as those in Embodiment 1.

Another situation is that due to different kinds of services, different users in the system have different lowest rate requirements. In order to guarantee fairness of users with different rate requirements, optimal target function is defined as $$\max R = \sum_{m=1}^{M} \sum_{k \in S_m} w_k \cdot b_{m,k} \quad (5)$$

wherein, $W_k$ is weight value of user k; the weight value is proportional to the lowest rate requirement of the user; $b_m$, k, and $s_m$ are the same as those in Embodiment 1.

The invention provides a method for joint optimization of schedule and resource allocation based on the genetic algorithm, which jointly performs schedule and resource allocation under the condition of satisfying limitations of schedule and power and optimizes system performance reliably and efficiently with small computing complexity. Specifically, the present invention provides a two-dimensional binary chromosome encoding mode, which is used for indicating the possible solutions of method of schedule policy and bit allocation on each subcarrier. Moreover, in order to meet the power constraints of each base station, the present invention provides a fitness function based on a penalty function, which is used for measuring the quality of the chromosomes; after reproduction process with four steps of selection, crossover, mutation, and correction, genes of the chromosomes with a high fitness value is continuously passed on to offspring generations so as to reach purpose of keeping on approaching approximate optimal solution of the problem. In addition, in order to guarantee convergence of the algorithm, in the present invention elite individual is added into the population and the population structure of the conventional genetic algorithm is further improved to provide a new population structure. The present invention adopts joint optimization of schedule and resource allocation, which will not result in performance loss caused by separately performing the processes of schedule and resource allocation; In addition, the invention has no defects from greedy algorithm in the prior art and can get a solution more close to the optimal solution from exhaustive search; the computing complexity of the genetic algorithm used in the present invention is far less than the exhaustive search, thus the performance and throughput of the system can be balanced; finally, since the genetic algorithm is very robust, it is suitably applied in real system and thus has a better prospect of application.

Although the present invention has been described through several exemplary embodiments, the invention is not limited to such embodiments. It is apparent that those skilled in the art can make various modifications and variations to the invention without departing from the scope of the present invention. Therefore, all equivalent solutions fall into the scope of the present invention, which is defined by the claims.

The invention claimed is:

1. A method for joint optimization of schedule and resource allocation based on genetic algorithm for use in a Coordinated Multi-Point (CoMP) communication system, comprising steps of S1, designing, by a processor, encoding chromosome for a potential solution of a problem;

S2, initializing settings, including setting an initial population, an elite, and control parameters of the genetic algorithm, by the processor;

S3, computing, by the processor, fitness values of respective chromosomes in a new population including the elite;

S4, determining, by the processor, whether the optimal solution is better than the elite, if yes, updating, by the processor, the elite and then proceeding step S5; otherwise, directly turning to step S5;

S5, determining, by the processor, whether a predetermined number of generations of population have been generated, if no, proceeding step S6; otherwise, directly turning to step S8;

S6, controlling, by the processor, the population to participate in reproduction process to generate two offspring chromosome individuals in the population;

S7, determining, by the processor, whether a predetermined number of offspring chromosome individuals have been generated, if yes, turning to step S3 to compute again;

otherwise, returning to step S6 and keeping on reproduction;

S8, performing the user schedule and resource allocation in the CoMP communication system, by the processor, according to the solution corresponding to the elite.

2. The method of claim 1, wherein in step S1, the chromosome individual is encoded in two-dimensional binary, by the processor.

3. The method of claim 1, wherein in step S1, if bandwidth of a base station in the system is divided into M subcarriers uniformly, each chromosome individual consists of M genetic vectors, with binary bits of each genetic vector being divided into two parts of user schedule policy and bit allocation status.

4. The method of claim 1, wherein in step S2, the control parameters which are initialized include population size, number of generations, and mutation probability.

5. The method of claim 1, wherein in step S3, the fitness value is calculated, by the processor, based on a fitness function of a penalty function.

6. The method of claim 5, wherein in step S3, the fitness function is as follows:

$$Fit(G) = \begin{cases} R(G) & G \text{ is feasible solution} \\ R(G) + \lambda_0 \cdot \sum_{n=1}^{N} \text{penalty}(n, G) & G \text{ is unfeasible solution} \end{cases}$$

wherein R(G) is an optimal target value corresponding to the chromosome G, and $\lambda_0$ is a penalty factor reflecting toughness of penalty; penalty(n, G) is a punishment which is brought as the power constraint of the base station n cannot be satisfied, and is defined as negative different value between the maximum transmission power and actual transmission power of the base station n; and N is the number of cooperating base stations in the system.

7. The method of claim 6, wherein the function of the optimal target value is $$\max R = \sum_{m=1}^{M} \sum_{k \in S_m} b_{m,k},$$

$$\max R = \sum_{k \in S_m} \log_2 \left( \sum_{m=1}^{M} b_{m,k} \right)$$

or $$\max R = \sum_{m=1}^{M} \sum_{k \in S_m} w_k \cdot b_{m,k};$$

wherein, M is the number of subcarriers resulted from equally dividing the bandwidth of the base station in the system; $b_{m,k}$ represents bit rate of user k on subcarrier m and when three modulating modes, i.e., QPSK, 16QAM, 32QAM, supported by LTE is used, $b_{m,k} \in \{0,2,4,6\}$; $s_m$ is a set of the users scheduled on the subcarrier m and the number of elements in the set is less than or equal to N; and $W_k$ is a weight value of user k, in which the weight value is proportional to the lowest rate requirement of the user.

8. The method of claim 1, wherein in step S6, the reproduction process includes four stages of selection, crossover, mutation and correction.

9. The method of claim 8, wherein in the stage of selection, Roulette wheel selection algorithm is used for selecting parents.

10. The method of claim 8, wherein in the stage of crossover, crossover is uniformly performed.

* * * * *